United States Patent [19]

Karras

[11] 4,134,104

[45] Jan. 9, 1979

[54] DEVICE FOR DISPLAYING DATA IN THREE DIMENSIONS

[76] Inventor: Ernest Karras, 10974 Cedar Ave., Bloomington, Calif. 92316

[21] Appl. No.: 717,496

[22] Filed: Aug. 25, 1976

[51] Int. Cl.[2] .................................... G06F 3/14

[52] U.S. Cl. .................................... 340/780; 340/782; 340/781

[58] Field of Search ........................ 340/324 R, 324 M

[56] References Cited

U.S. PATENT DOCUMENTS

| | | | |
|---|---|---|---|
| 2,543,793 | 3/1951 | Marks | 340/324 R |
| 3,636,551 | 1/1972 | Maguire | 340/324 R |
| 3,848,247 | 11/1974 | Sherr | 340/324 M |

*Primary Examiner*—Marshall M. Curtis
*Attorney, Agent, or Firm*—Boniard I. Brown

[57] ABSTRACT

A device for displaying information reducible to three spatial parameters such as three-dimensional mathematical formulae, three-dimensional maps, and the spatial distributions of vehicles moving in three-dimensional space includes a plurality of transparent plastic sheets arranged in a spaced, parallel array. Each of the transparent sheets is marked with a coordinate grid rectangular, polar, logarithmic, or other and is spaced from adjacent sheets in a regular pattern linear, logarithmic, or other. The coordinate points defining the information to be displayed are marked on each sheet, so that viewing the complete assembly provides a three-dimensional plot of the information viewable from any angle and in true scale. In an alternate form of the invention, the coordinate grids of each of the transparent sheets are defined by electrical conductors with a light-emitting structure, incandescent or luminescent, at the grid intersections whereby a display may be energized by passing current through the information-defining intercepts.

10 Claims, 13 Drawing Figures

FIG. 1.
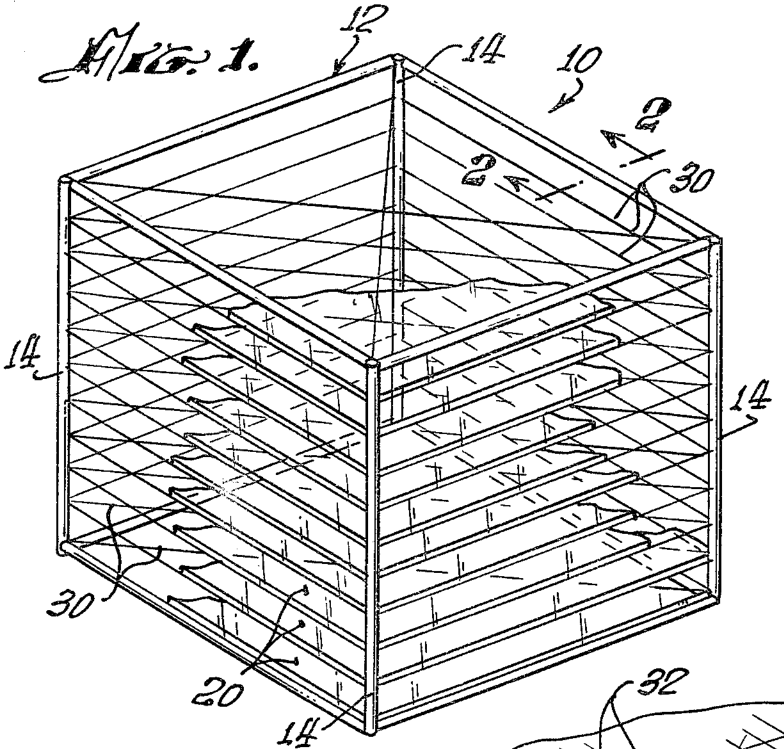
FIG. 2.
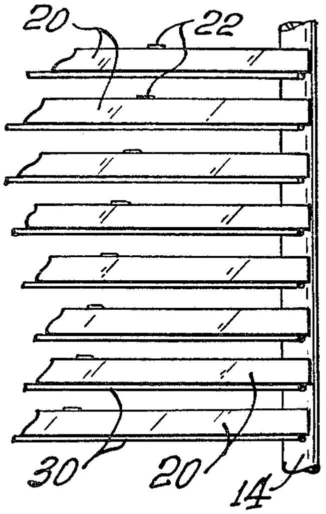
FIG. 3.
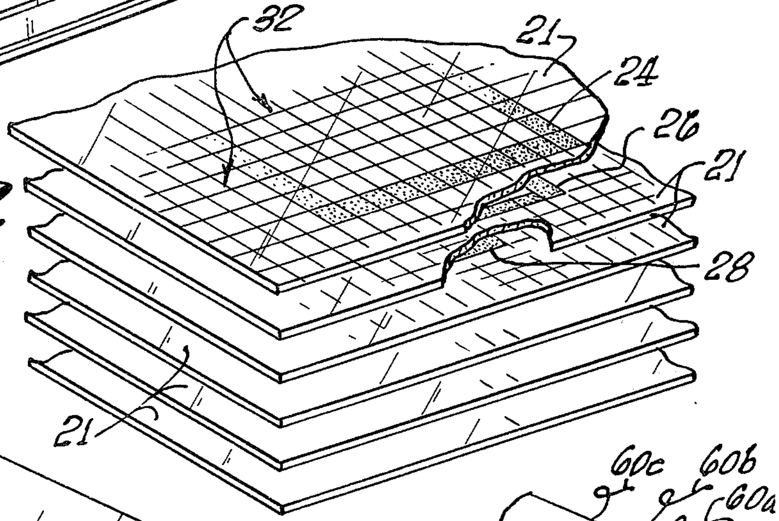
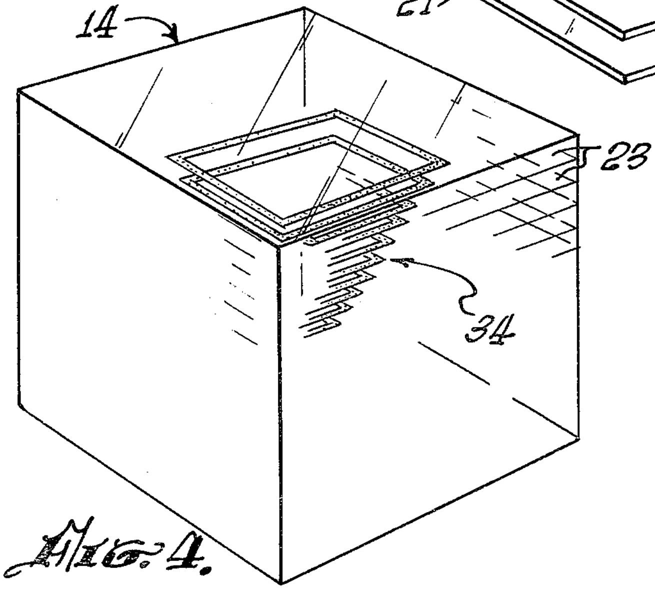
FIG. 4.
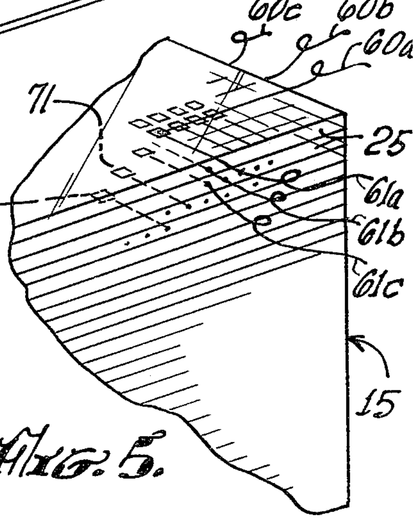
FIG. 5.

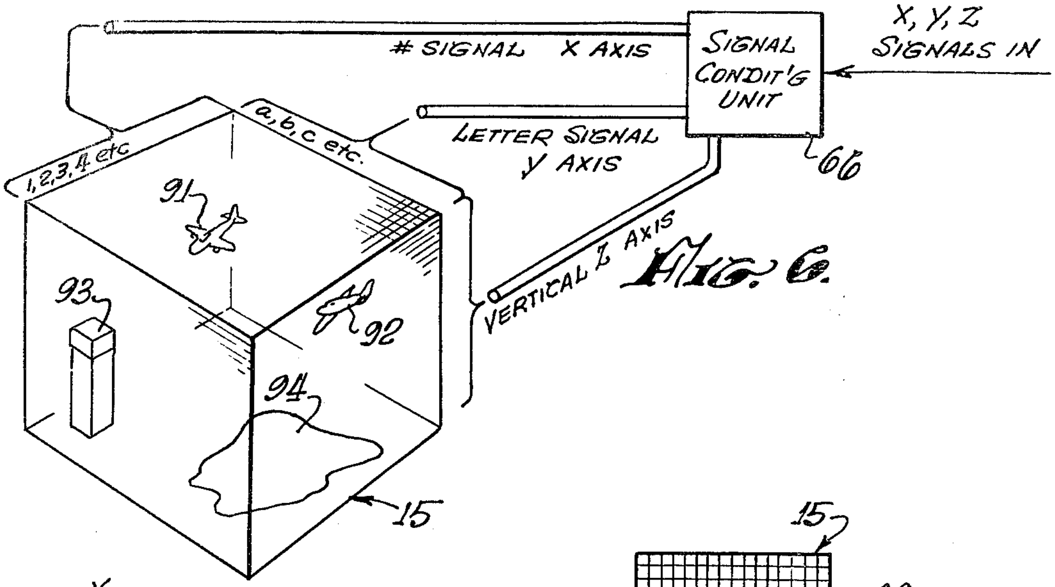
FIG. 6.
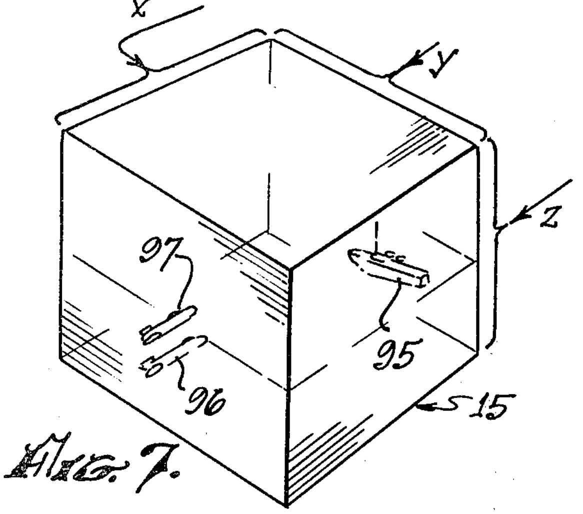
FIG. 7.
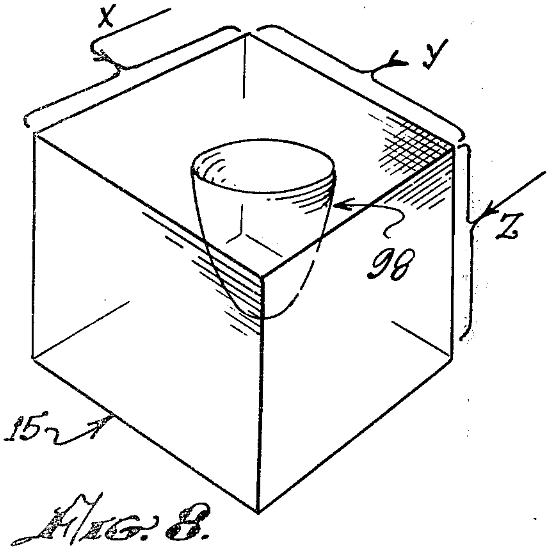
FIG. 8.
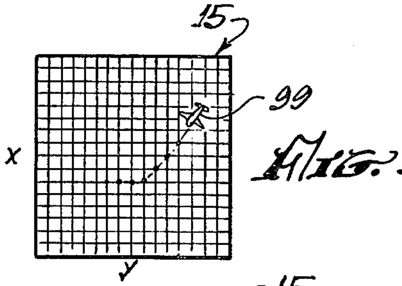
FIG. 9.
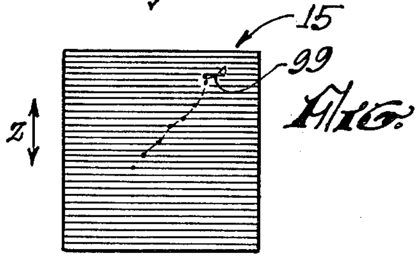
FIG. 10.
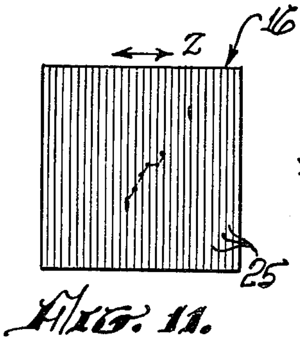
FIG. 11.
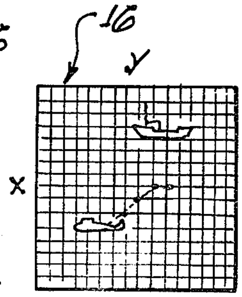
FIG. 12.
FIG. 13.
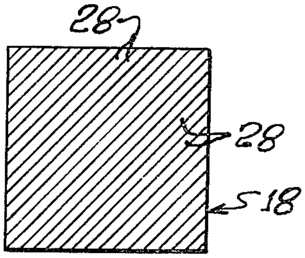

DEVICE FOR DISPLAYING DATA IN THREE DIMENSIONS

BACKGROUND OF THE INVENTION

The invention relates to devices for displaying information defined by contour lines in three-dimensional space. More particularly, it relates to such devices wherein one coordinate axis is defined by a plurality of parallel transparent sheets.

In the mathematical arts, in physics, in engineering, and in most other fields dealing with quantizable information, one of the main problems in dealing with such information is the manner of presentation for examination or study. Most such information is inherently three-dimensional and the visualization of complex surfaces in three dimensions is difficult for the human mind. In particular, the interrelationship of such surfaces, such as the planes of intersection between two three-dimensional bodies, may be impossible to visualize without graphical representation, and are poorly represented in the conventional two-dimensional projections to which a graph paper, blackboards, etc., constrain such representations.

Particular needs for three-dimensional displays exist in the teaching of three-dimensional geometry and like subjects, in topography, and in the manipulation of data involving the relative locations of a plurality of moving and stationary objects in a three-dimensional environment, such as in air traffic control and in naval submarine operations.

It is therefore a primary object of the invention to provide a device for generating three-dimensional displays which provide a viewer with a clear representation of the information to be displayed.

It is a further object of the invention to provide such three-dimensional displays in which the two-dimensional contours of the object or objects to be represented are drawn on transparent planar media and the two-dimensional sections subsequently assembled into a three-dimensional structure in which the spacing of the planar media corresponds to the sectioning plane of the two-dimensional contour it bears.

It is another object of the invention to teach the use in three-dimensional display devices of transparent sheets marked with a grid representing the coordinate system in which the information is to be presented.

It is another object of the invention to teach the construction of permanent three-dimensional display devices utilizing transparent parallel sheets suitably spaced, wherein the coordinate grid system is established by means of electrical conductors with light-emitting means provided at the intersections of the coordinate grid, so that energizing any arbitrary pair of conductors will result in the emission of light at their intersection.

It is also an object of the invention to provide a three-dimensional display in which the transparent sheets bearing the displayed information are retained in a frame forming a rectangular parallelepiped.

SUMMARY OF THE INVENTION

The foregoing objects, and other objects and advantages which shall become apparent from the description of the preferred embodiment thereof, are attained by the use of an array of planar, transparent sheets, commonly of a plastic of glassy composition, retained in a skeletal frame forming a rectangular parallelepiped. The transparent sheets referred to above are aligned in parallel and generally, but not necessarily, parallel to one face of the frame. The spacing of the sheets may be uniform, or it may vary to represent a logarithmic coordinate axis or some other non-uniform spatial distribution appropriate to the information to be represented thereon.

Each of the transparent sheets is designated to conform to a sectional plane of the three-dimensional object, mathematical function, or topographical surface to be displayed, and the contours corresponding to that sectional plane are marked thereon. The marking may be undertaken manually, using drafting instruments, drafting machines, or other aids. In the case of the electrically activated light-emitting embodiment, more fully described below, the indications may be generated in a computing device. In the simplest form of the practice of the invention, each contour on a given sheet may be represented by a series of dots.

When assembled into the frame, the contour lines and/or dots representing the contour lines, merge to form a visual outline of the object or function, readily viewed from any arbitrary vantage point and readily scaled in terms of the coordinate system represented by the frame and/or marked out on the sheets.

Where the three-dimensional display is to be used for general visualization of mathematical formulae and other purposes where exact dimensional information is not to be derived from the display, a simple frame may be constructed in which equally spaced transparent sheets represent sections in the x-y planes of a cartesian coordinate system. If the frame is made square in section corresponding to the inserted sheets, threads or wires stretched across the corners may be used to define the x and y axes, and may also be used to support the transparent sheets.

Where the information to be displayed is very complex, or is changing with a fourth dimension, such as time, an electrical developmemt of the individual contours may be utilized. The coordinate system on each of the transparent sheets is replaced with electrical conductors affixed to the sheets, as by plating, representing either an x, y rectangular coordinate system or a polar coordinate system with concentric circles and radial lines, and a light-emitting device or means installed at each intersection of the coordinate grid. Light may be generated by miniature bulbs, by electroluminescent phosphors, by light-emitting diodes, or other means. Power to the grid is supplied by a switching system which may be controlled by a computer or other signal processing apparatus.

In some embodiments of the invention, provision may be made for the reception of two or more transparent sheets at each elevation of the frame, so that a plurality of three-dimensional outlines may be generated simultaneously without the requirement that all such contours be drawn on the same sheet.

BRIEF DESCRIPTION OF THE DRAWINGS

The preferred embodiment of the invention is hereinafter described in detail, with reference to the accompanying drawings, wherein:

FIG. 1 is a perspective view of a three-dimensional display device with a cubic frame, adapted to represent objects drawn with reference to a linear cartesian coordinate system, two of whose axes are defined by transparent filaments tied crosswise in the frame at uniform spacings;

FIG. 2 is a partial transverse sectional view, taken along section line 2—2 in FIG. 1;

FIG. 3 is a fragmentary perspective view of a display device incorporating a spaced array of flat, transparent plates upon which the appropriate outlines of the image to be displayed are marked;

FIG. 4 is a frameless embodiment of the three-dimensional display device of the invention, incorporating an array of stacked plastic plates whose thickness defines the resolution of the displayed image along one coordinate axis;

FIG. 5 is a partial perspective view of a display device utilizing electrical conductors to form a coordinate grid on the surface of planar, transparent, non-conducting plates in the array, separated at each node by a conductive, light-emitting substance;

FIG. 6 is a partly schematic view of a three-dimensional display similar in construction to the embodiment of FIG. 5, employed as an aid in air traffic control;

FIG. 7 is a view like that of FIG. 6, showing a device providing visualization of the relative locations and motions of surface ships and submarines;

FIG. 8 is another view like that of FIG. 6, showing a device for visualizing three-dimensional images of mathematical surfaces;

FIG. 9 is a top view of the device of FIG. 6, indicating the manner in which time-based information on the track of an aircraft may be presented;

FIG. 10 is a side elevational view of the device of FIG. 7, showing horizontally aligned transparent sheets;

FIG. 11 shows an alternative form of the device of FIG. 7, utilizing plates stacked in a vertically aligned array;

FIG. 12 is a side elevational view of the array of FIG. 11; and

FIG. 13 is a schematic representation of a device of the invention in which the array of display planes is oriented at an angle to the vertical.

DESCRIPTION OF THE PREFERRED EMBODIMENT

The perspective view of FIG. 1 shows a three-dimensional display 10, constructed in accordance with the teaching of the invention, comprising a cubical frame 12 and a plurality of transparent display sheets 20 supported upon cross-wires 30. The frame 12 is defined by four rigid elongated vertical rods 14 and twelve horizontal bars 16 affixed in the vertical rods.

The vertical rods 14 are perforated at uniform intervals and the cross-wires 30 pass through these perforations and are secured taughtly to rods 14 at opposing edges of the frame 12. The cross-wires 30 thus form diagonals across the space defined by the frame 12, intersecting in the center and being spaced uniformly along a vertical axis passing through these intersections and parallel to the vertical rods 14.

FIG. 2 is a partial, transverse section through the structure of frame 12, showing a typical vertical rod 14 and cross-wires 30 extending therefrom. Transparent display sheets 20 are placed upon each pair of cross-wires. The sheets are rigid or semi-rigid and are preferably made from a vitreous or plastic composition whose surface properties permit the ready placement of indicia 22 thereon, and the subsequent removal of same.

The indicia 22 are opaque and may be formed by glueing tabs of a suitable material upon the surface of the display sheets 20, or may represent dots, lines, arcs or distinctive markers drawn or painted on the display sheets. The uniform spacing of the display sheets, corresponding to the spacing of the cross-wires 30, defines one coordinate axis of the three-dimensional display; the other two axes are preferably defined by the cross-wires 30 themselves.

The indicia 22 are placed, drawn, or painted onto the display sheets 20 according to a predefined pattern representing the coordinates of the information to be displayed prior to assembly into the frame 12. When all the sheets 20 required to define the three-dimensional information are so marked and assembled into the display structure 10, the image of the information becomes a readily visualized and manipulated outline.

The display, typically of a three-dimensional geometric structure, is readily viewed from any arbitrary angle, and sections thereof may be readily scaled along any arbitrary line, whether or not coincident with one of the coordinate axes.

Where the intersection of two or more of such figures, surfaces, or lines is to be visualized with the aid of the display device 10, the appropriate intercepts with the several display sheets 20 may be mapped onto the same sheets using differential coloring, different markers, or interrupted lines of differing construction, so that the several components of the display may be readily distinguished. It is also possible to map the information representing different component figures onto different sets of display sheets 20, and to assemble these in close contact at each of the appropriate levels of the display, so that two or more display sheets 20 are supported on each pair of cross-wires 30. In this latter use, the thickness of the display sheets 20 must be allowed for in defining the coordinates of the markings and the sheets assembled in proper order to permit accurate scaling of the resulting composite display.

The partial perspective view of FIG. 3 shows an alternate construction of the display sheet array, comprised of a plurality of transparent display sheets 21. These sheets are maintained in parallel, superposed alignment by support means corresponding to the cross-wires 30 of the display 10 in FIG. 1. These support means may take many forms, typically slots or guides in the vertical rods 14 of the frame 12, or its equivalent, but where cross-wires are used they are made from a transparent material such as nylon string, since the grid system of the display incorporating the sheets 21 is marked onto, or etched into, the surface of the display sheets. Typically, the grid in the planes parallel to the alignment of the display sheets 21 is represented by a set of rectangular grid lines 32, although a radial (polar) coordinate grid may alse be used.

Indicia 24, 26 and 28 are shown on the surfaces of three adjoining display sheets 21 in FIG. 3, and form part of the three-dimensional figure which is to be visualized with the aid of the array of display sheets 21.

The perspective view of FIG. 4 shows a three-dimensional display 14 constructed without a frame by stacking a plurality of display sheets 23 directly one upon another. The display sheets 23 are made with a thickness corresponding to the desired grid definition along the vertical axis and the appropriate intercepts and coordinates of the information to be displayed are marked or painted upon their surfaces. In FIG. 4 the display comprises the outline 34 of an inverted pyramid, defined by its intercepts on the interfaces between the stacked display sheets 23.

The partial perspective view of FIG. 5 shows the construction of a three-dimensional display 15 with a stacked structure analogous to that of FIG. 4, with display sheets 25 in horizontal array with abutting planar surfaces.

The display 15 does not rely on indicia marked or painted onto the surfaces of its constituent display sheets 25 to define the information to be displayed. It utilizes, instead, electrically energized active display nodes at preselected coordinate points within the volume of the display 15. Each display sheet 25 is subdivided into fields by grid lines 60 and 61, forming orthogonal arrays as typified by lines 60*a*, 60*b*, 60*c*, 61*a*, 61*b* and 61*c*. The grid lines 60 and 61 are conductors of electrical current, and are connected at their mutual intercepts by conductive display markers 71. Preferably, the markers 71 are spots of electrophorescent material which emit light upon the passage of electric current between the particular conductors 60 and 61 to which they are connected.

In similar embodiments the markers 71 may be formed of miniature incandescent lamps, light-emitting diodes, or other light-producing devices which are responsive to the simultaneous energization of two or three conductors affixed to them. A display is produced when the conductors 60 and 61, corresponding to all the intercepts of the grid which define the shape, or shapes, to be displayed in the plane of one of the display sheets 25, are energized to light up the appropriate intercept markers 71. The same process is performed for each of the display sheets 25 and a three-dimensional image is created within the display volume of the device 15.

FIG. 6 is a perspective, partly schematic, view of a display device 15 employed as an aide in air traffic control. The three-dimensional coordinates of the physical environment, typically of a hill 94 and an airport control tower 93, are fed into a signal conditioning unit 66, and combined with the coordinates of airplanes 91, 92 moving in the vicinity of the airport. The latter information may be typically derived from radar scanning via a suitable computer interface. The signal conditioning unit 66 provides the instantaneous coordinates of all objects, stationary and moving, to the conductors embedded in the display sheets 25 of the display 15, so that the relative locations are visually available to the controller. By viewing the information from several angles, the controller can determine the probable paths of the airplanes 91 and 92 relative to each other and to the ground features, information which is not directly available from the conventional two-dimensional displays available to such controllers.

FIG. 7 is another view of a three-dimensional display 15, showing the relative positions of a surface ship 95 and two submarines 96, 97. The information may be derived from radar and sonar tracking, or may be generated by a computer for purposes of training or wargame situations.

The similar view of FIG. 8 also represents a display module 15, utilized to project the outline of a geometric figure 98 by the energization of the appropriate conductors in the display sheet array within the display module.

FIG. 9 is a view of the top of a typical three-dimensional display, while FIG. 10 is a side view of the stack of display sheets 25. These Figures show the track of an airplane 99 as they may be presented in two of the possible three two-dimensional views of the display 15.

FIGS. 11 and 12 are analogous to FIGS. 9 and 10, and show the relative tracks of a submarine and a surface vessel as seen projected on two lateral faces of a display module 16, constructed with an array of display sheets 25 in a vertical alignment.

FIG. 13 shows yet another embodiment of the invention, incorporating display sheets 28 in an angularly oriented array within the confines of a three-dimensional display device 18.

In various of the embodiments hereinbefore described, the display sheets may be immersed in an appropriate liquid to eliminate extraneous reflections from the surfaces of the sheets.

The invention has been described with reference to its preferred embodiment and variants thereof; variations in the constructional details and in the materials employed, uses of non-uniform grids, logarithmic for example, alternate materials and arrangements, are deemed encompassed by the disclosure, delimited only by the appended claims.

The inventor claims:

1. A device for providing a data display in a three-dimensional configuration, comprising:

a cubical frame including four vertical posts, a base frame, and a top frame similar to said base frame;

a substantial plurality of transparent planar data sheets in stacked array, each of the sheets having respective selectively positioned visible datum elements thereon; and a plurality of support separators mounted in spaced relation on said posts and within said cubical frame to receive and support respective ones of the transparent planar data sheets in an array stacked one above the other;

whereby said respective datum elements on the respective data sheets cooperate to define a data display in a three-dimensional configuration.

2. The cubical frame defined in claim 1 wherein said support separators comprise wires extending between diagonally opposed posts to receive and support said planar data sheets.

3. The cubical frame defined in claim 1 wherein said support separators are equispaced.

4. The cubical frame defined in claim 1 wherein said support separators constitute slots in said vertical support members to receive said planar data sheets.

5. The three-dimensional data display defined in claim 1 wherein the spacing of said spaced separators is non-linear in accordance with a mathematical relationship.

6. The three dimensional data display defined in claim 1 wherein said transparent data sheets include a grid of predetermined dimensions on each.

7. A device for providing a data display in a three-dimensional configuration, comprising:

a cubical frame forming a right parallelepiped;

a substantial plurality of transparent planar data sheets in stacked array, each of the sheets having respective selectively positioned visible datum elements thereon; and whereby said respective datum elements on the respective data sheets cooperate to define a data display in a three-dimensional configuration.

8. A device for providing a three-dimensional data display, according to claim 1, wherein:

the respective stacked data sheets are in such spaced relation that the datum elements on respective sheets are accessible for physical measurements of the data or configuration displayed.

9. A device for providing a data display in a three-dimensional configuration, comprising:

a cubical frame forming a right parallelepiped, a substantial plurality of transparent planar data sheets in stacked array, whereby said respective datum elements on the respective data sheets cooperate to define a data display in a three-dimensional configuration, a first substantial plurality of electrical conductors on each of said data sheets and extending thereacross in a first direction, a second substantial plurality of electrical conductors extending across each said data sheet in a second direction so that said first conductors intersect said second conductors, an illuminable indicia means interconnected at each respective intersection between a respective one of said first conductors and a respective one of said second conductors, and electrical signal means for selectively energizing selected ones of said first conductors and selected ones of said second conductors on each data sheet to illuminate selected ones of the illuminable indicia means to define visible selectively positioned datum elements on the respective data sheets to cooperate to define an illuminated data display in three-dimensions.

10. A device for providing a three-dimensional data display, according to claim 9, wherein:

the respective stacked data sheets are in such spaced relation that the datum elements on respective sheets are accessible for physical measurements of the data or configuration displayed.

* * * * *